US008743157B2

(12) United States Patent
Singaraju et al.

(10) Patent No.: US 8,743,157 B2
(45) Date of Patent: Jun. 3, 2014

(54) AUDIO/VISUAL ELECTRONIC DEVICE HAVING AN INTEGRATED VISUAL ANGULAR LIMITATION DEVICE

(75) Inventors: Snehitha Singaraju, Gurnee, IL (US); Robert A Zurek, Antioch, IL (US)

(73) Assignee: Motorola Mobility LLC, Chicago, IL (US)

( * ) Notice: Subject to any disclaimer, the term of this patent is extended or adjusted under 35 U.S.C. 154(b) by 224 days.

(21) Appl. No.: 13/182,958

(22) Filed: Jul. 14, 2011

(65) Prior Publication Data
US 2013/0016130 A1 Jan. 17, 2013

(51) Int. Cl.
*G09G 5/10* (2006.01)

(52) U.S. Cl.
USPC ........................................................ 345/690

(58) Field of Classification Search
CPC ........................................................ G09G 5/10
USPC ............... 345/690, 156, 1.3; 381/77; 600/544
See application file for complete search history.

(56) References Cited

U.S. PATENT DOCUMENTS

| | | | |
|---|---|---|---|
| 4,334,740 A | 6/1982 | Wray | |
| 5,031,216 A | 7/1991 | Gorike et al. | |
| 5,443,076 A * | 8/1995 | Bau | 600/544 |
| 6,041,127 A | 3/2000 | Elko | |
| 6,507,659 B1 | 1/2003 | Iredale et al. | |
| 7,020,290 B1 | 3/2006 | Ribic | |
| 7,346,315 B2 | 3/2008 | Zurek et al. | |
| 7,369,100 B2 * | 5/2008 | Zacks et al. | 345/1.3 |
| 7,787,328 B2 | 8/2010 | Chu et al. | |
| 8,031,273 B2 | 10/2011 | Yabuta et al. | |
| 2003/0160862 A1 | 8/2003 | Charlier et al. | |
| 2004/0114770 A1 | 6/2004 | Pompei | |
| 2005/0057491 A1 * | 3/2005 | Zacks et al. | 345/156 |
| 2006/0140417 A1 | 6/2006 | Zurek | |
| 2006/0176541 A1 | 8/2006 | Woodgate et al. | |
| 2006/0269080 A1 | 11/2006 | Oxford et al. | |
| 2006/0280315 A1 * | 12/2006 | Norris et al. | 381/77 |
| 2007/0035829 A1 | 2/2007 | Woodgate et al. | |
| 2007/0109400 A1 | 5/2007 | Woodgate et al. | |
| 2008/0170718 A1 | 7/2008 | Faller | |
| 2009/0010453 A1 | 1/2009 | Zurek et al. | |
| 2010/0110232 A1 | 5/2010 | Zhang et al. | |

FOREIGN PATENT DOCUMENTS

EP 1643769 B1 12/2009
GB 2348040 A 9/2000

OTHER PUBLICATIONS

Gary W Elko, "Superdirectional Microphone Arrays" and Yiteng (Arden) Huang, et al "Microphone Arrays for Video Camera Steering" in Steven L. Gay and Jacob Benesty (editors), "Acoustic Signal Processing for Telecommunication", 2000, pp. 181-237 and 239-259, Kluwer Academic Publishers.
U.S. Appl. No. 12/843,555, filed Jul. 26, 2010, in the name of Robert Zurek et al, entitled Electronic Apparatus for Generating Beamformed Audio Signals with Steerable Nulls.
Privacy & Protection on-the-go, 3M Mobile Interactive Systems Division, Copy Right Dec. 2011.

* cited by examiner

*Primary Examiner* — Fred Tzeng

(57) ABSTRACT

An audio/visual (A/V) electronic device includes a display and an integrated visual angular limitation device employed to limit a viewable angular area of the display. One or more directional acoustic transducers that have an associated characteristic acoustic pattern will include at least a portion of the associated characteristic acoustic pattern in cooperative alignment with the limited viewable angular area of the display.

20 Claims, 8 Drawing Sheets

AUDIO/VISUAL ELECTRONIC DEVICE HAVING AN INTEGRATED VISUAL ANGULAR LIMITATION DEVICE

FIELD OF THE DISCLOSURE

The present disclosure relates generally to audio/visual (A/V) electronic device audio capture and playback and more particularly to microphone and speaker beam-forming in stereo A/V conferencing or multimedia playback.

BACKGROUND

Handheld multi-media devices can have several form factors. For example, tablet computing devices, slab-type smartphones, netbooks, or docked devices that are useful in multi-operating systems. To achieve optimum audio reception or playback for a user of these handheld devices, audio beamforms have either been oriented towards the user from the handheld device or have been oriented from the user towards the handheld device. Some handheld devices present a greater challenge for orientating audio beamforms because of their form factor and because a handheld device can be and is often moved in relation to the user during operation. These challenges can be addressed with additional electronics and signal processing; however, this approach can be costly and may affect the form factor of the handheld device, thus impacting aesthetic appeal to some users.

Accordingly, there is a need for an A/V electronic device having an integrated visual angular limitation device orientated or aligned with an audio beamform to aid in positioning of the A/V electronic device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
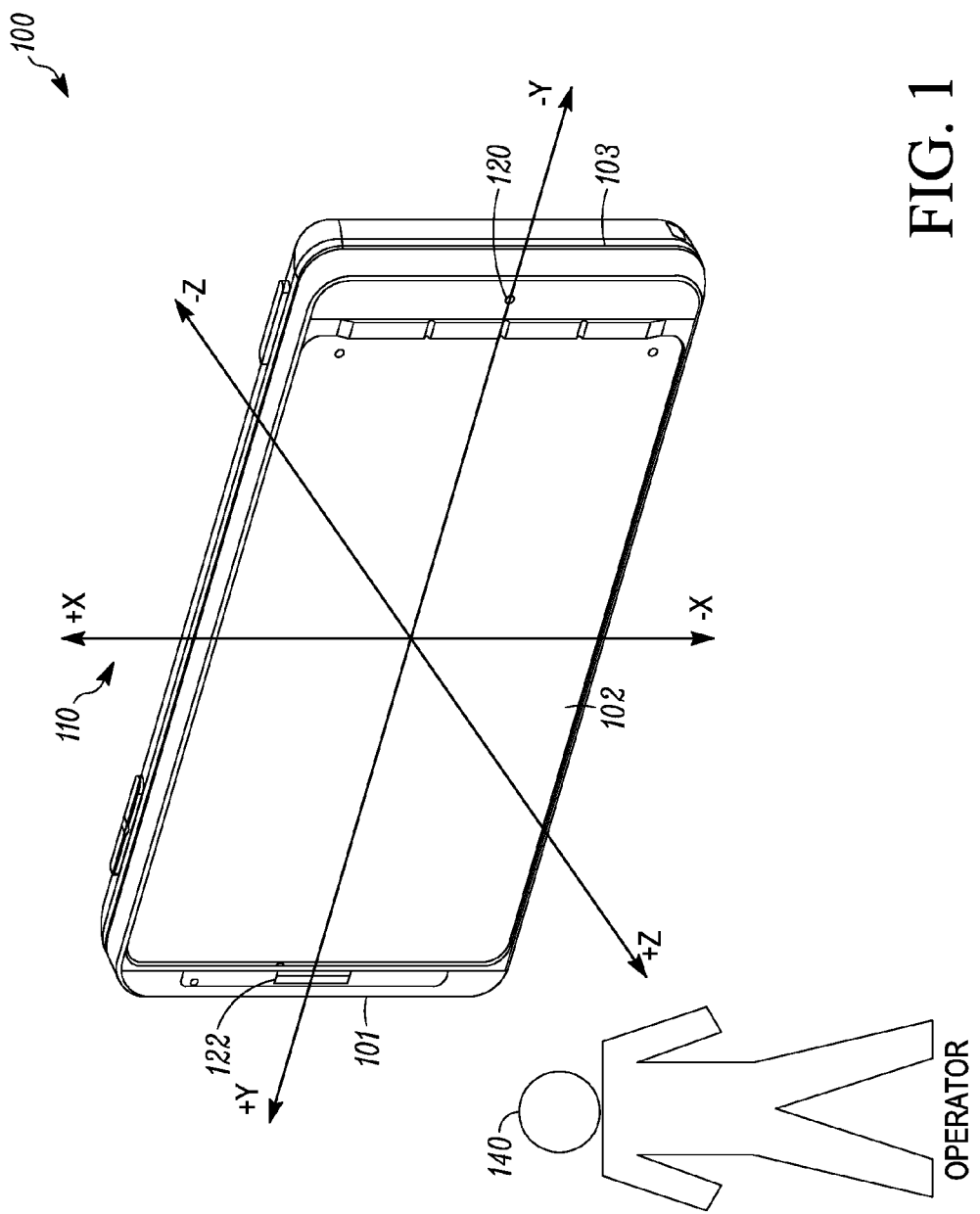
FIG. 1 is an exemplary schematic diagram of an A/V device having a display aligned in relation to an operator of the A/V device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An audio/visual (A/V) electronic device includes a display and an integrated visual angular limitation device employed to limit a viewable angular area of the display. One or more directional acoustic transducers that have an associated characteristic acoustic pattern in a fixed orientation will include at least a portion of the associated characteristic acoustic pattern in cooperative alignment with the limited viewable angular area of the display. "Acoustic", as used herein, is defined as encompassing the area from the transformation from electrical energy to a molecular wave motion; and includes an area outside of an acoustic transducer in space. In contrast, "audio", as used herein, is defined as encompassing a subset of electronics and media, and may intersect with acoustics.

FIG. 1 is an exemplary schematic diagram of an A/V device 100 having a display 102 aligned in relation to an operator 140 of the A/V device 100. An XYZ coordinate system 110 provides a reference for the display 102 in relation to the operator 140. A/V device 100 also includes one or more speakers 122 housed in top portion 101 of the A/V device 100 and one or more microphones 120 housed in lower portion 103 of the A/V device 100. Accordingly, operator 140 is facing display 102 of the A/V device 100 in FIG. 1.

Figure 2:
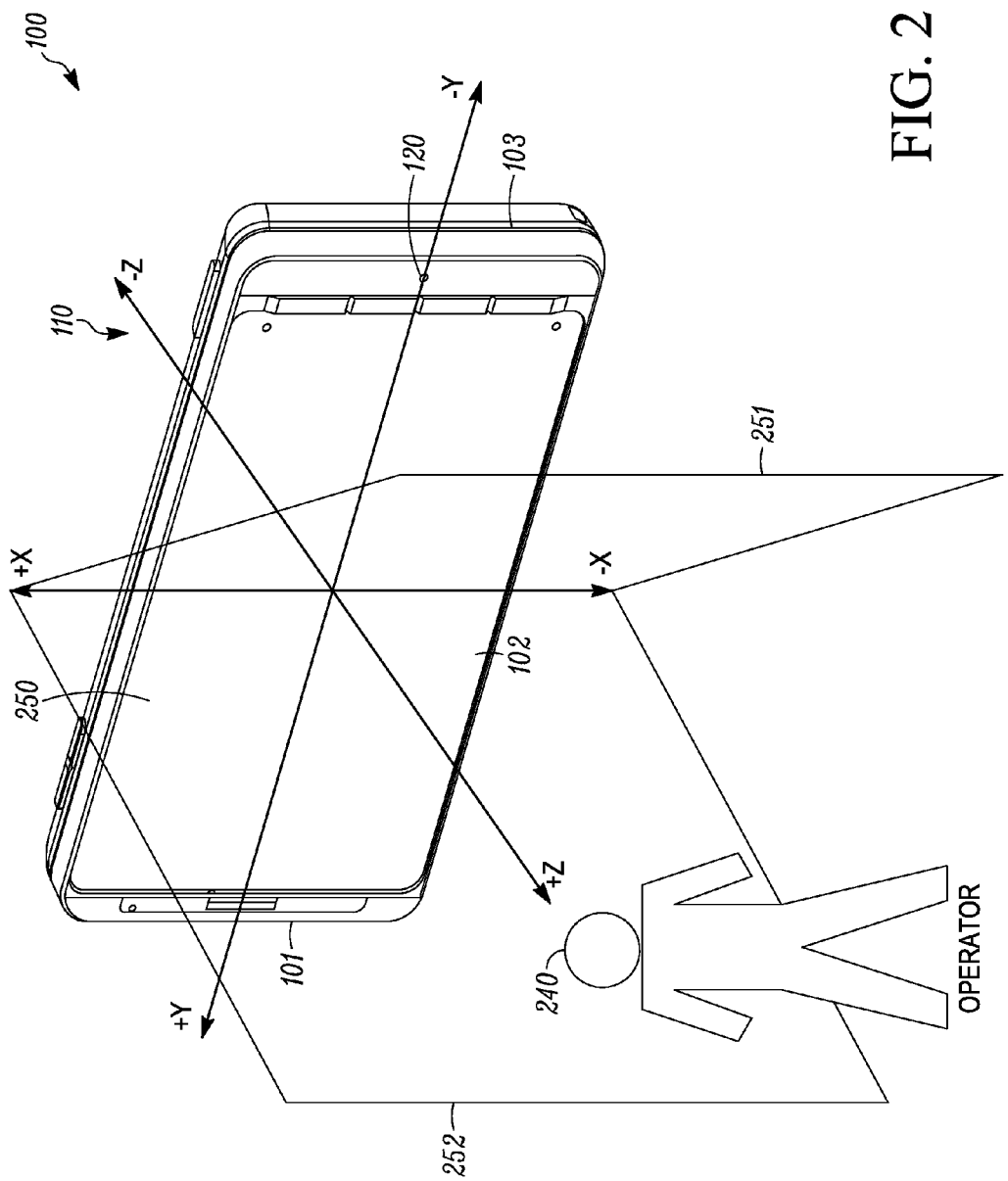
FIG. 2 is an exemplary schematic diagram of an A/V device having a display aligned in relation to an operator of the A/V device and shows boundaries of a viewable angular area of the display.

FIG. 2 is similarly an exemplary schematic diagram of an A/V device 100 having a display 102 aligned in relation to an operator 240 of the A/V device 100. In addition FIG. 2 shows boundaries (251 and 252) of a viewable angular area 250 of the display 102. Therefore, planes 251 and 252 are depicted as the bounds of the viewable angular area 250 of the display 102. The viewable angular area 250 has a limited view as the result of a visual angular limitation device integrated with the A/V device 100, such as the implementation of a film, a parallax barrier, a lenticular lens, a louvered barrier, a combination of film and selective backlighting, or an active layer of the display limiting the angle of viewability.

The integrated visual angular limitation device can take several forms. A first visual angular limitation device can attenuate the viewable image when a user is outside the viewable angular area boundary. Methods of attenuating an image outside of viewable angular area boundaries include various forms of screen privacy filters. Examples of screen privacy filter technology include micro-louver technology and color shifting optical film. A micro-louver or louvered barrier is a structure consisting of louvers normal to the display surface that block viewing of the display beyond a set angle off of the axis normal to the display. The louvers can be of any of the known technologies used in such a film. A second form of visual angular limitation device can be an image breakdown or image decorrelation or a lost of image focus external to a viewable angular area boundary. As such, the image can become blurred or decorrelated. The decorrelation of the image can lead a viewer to see more than one image or ghosting of an image as the viewer is outside of the limited viewable angular area. The image may undergo a transition as well. For example, the image may appear to transition from three-dimensional (3D) to two-dimensional (2D).

Auto stereoscopic displays can be utilized to not only create a stereoscopic image, but also can be tapped as a design choice for limited angular viewable area where a stereo image is actually viewable to an operator of an A/V device. However, once the image is viewed from outside the limited angular viewable area, the image will appear to ether revert to a two-dimensional image, become decorrelated, appear blurred or defocused, or substantially dim until the image is no longer viewable. Other image degradation effects in addition to image decorrelation or blurring can include color shifting of an image. Methods of producing auto-stereoscopic images for a display device include employing lenticular lenses, 3D optical film, and parallax barriers. While lenticular lenses and 3D optical films are passive devices, a parallax barrier can be passive or active. A passive parallax barrier can consist of a grating in front of the display that would block the view of individual columns of pixels to each of the operator's eyes. Alternatively the parallax barrier could be active as in a LCD layer in which the grating could be turned on or off or changed in dimension. One or more of these techniques can be combined to limit an angular viewable area of a display.

Notably, dynamic control of the viewable angle and the angular acoustic pattern can be achieved with a parallax barrier. In addition, altering the width of acoustic beams and nulls can be employed. The combination of beam-forming and null forming technology with an adaptive limited viewable angular area can provide a variable angular width to the viewable/audible area associated with a display device (also referred to as an A/V device).

In the case, where additional security or noise reduction is desired, the viewable angular area boundaries can be brought closer together in conjunction with a narrowing of acoustic beams and nulls, resulting in an operator of the display device to position the display device more precisely. More precise positioning of the display screen allows for a higher signal-to-noise-acoustic beam or null to be formed and increases the chances that the acoustic beam or null will impact the operator of the display device.

Figure 3:
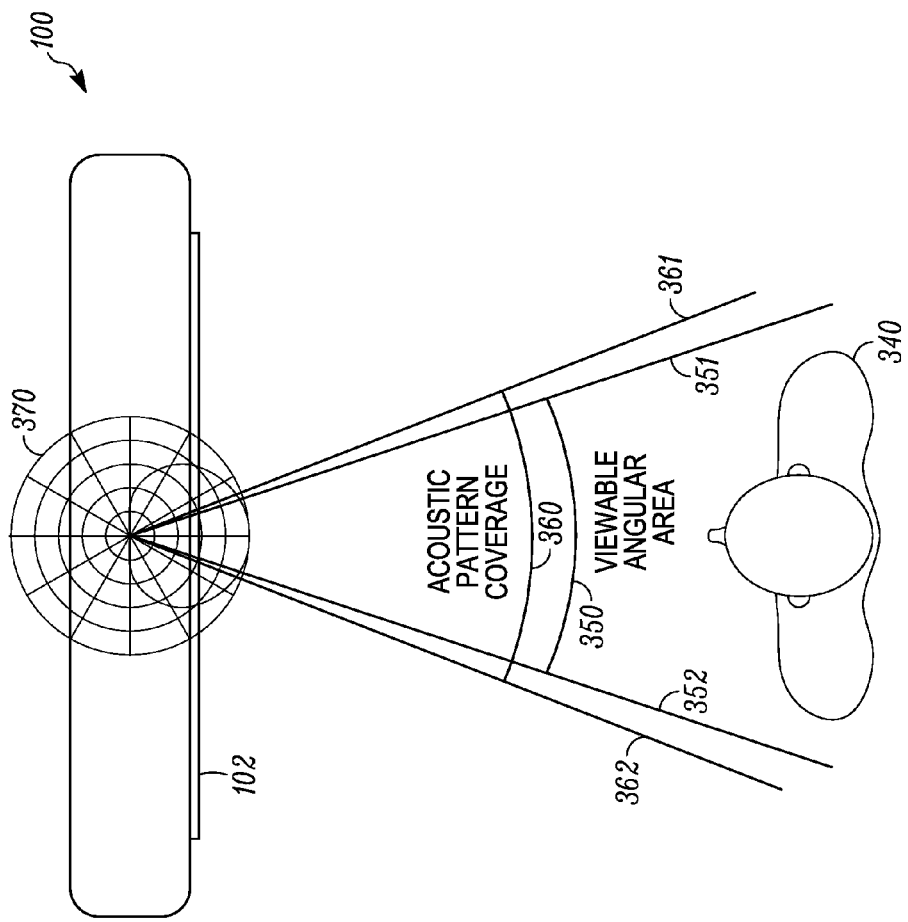
FIG. 3 is a top down view of the display of the A/V device and operator within a bounded viewable angular area of the display.

FIG. 3 is a top down view of the display 102 of the A/V device 100 as shown previously in FIGS. 1 and 2; and operator 340 within a bounded viewable angular area 350 of the display 102. A viewable angular area 350 includes boundaries 351 and 352. Operator 340 has his head positioned within viewable angular area 350. Acoustic pattern coverage 360 is directed or orientated to the head of operator 340 and includes boundaries 361 and 362 when the operator is within the viewable angular area. As exemplarily illustrated in FIG. 3, the position of the head of operator 340 is both within the viewable angular area 350 and the acoustic angular coverage area 360 of a characteristic acoustic pattern 370. Acoustic angular coverage area 360 has been aligned with the viewable angular area 350. Therefore, visual output and audio output are deemed optimal to operator 340, because of said positioning of operator 340.

Figure 4:
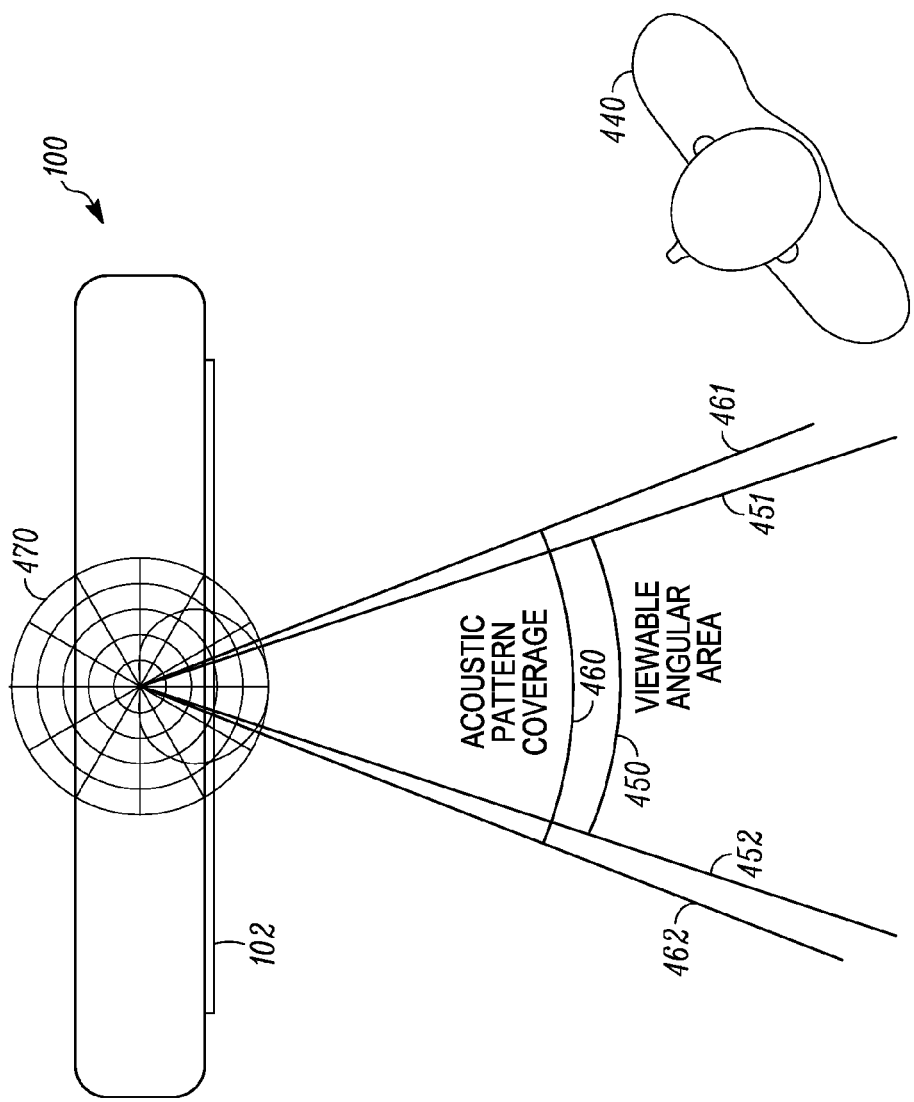
FIG. 4 is a top down view of the display of the A/V device and operator external to the bounded viewable angular area of the display.

FIG. 4 is a top down view of the display 102 of the A/V device 100 as shown previously in FIGS. 1 and 2; and operator 440 external to a bounded viewable angular area 450 of the display 102. A viewable angular area 450 includes boundaries 451 and 452. Operator 440 has his head positioned outside of the viewable angular area 450. Acoustic pattern coverage 460 includes boundaries 461 and 462. As exemplarily illustrated in FIG. 4, the position of the head of operator 440 is both external to the viewable angular area 450 and the acoustic angular coverage area 460 of a characteristic acoustic pattern 470. Acoustic angular coverage area 460 has been aligned with the viewable angular area 450. However, both visual output and audio output are orientated away from the head of operator 440 and deemed sub-optimal to operator 440, because of said positioning of operator 440.

Figure 5:
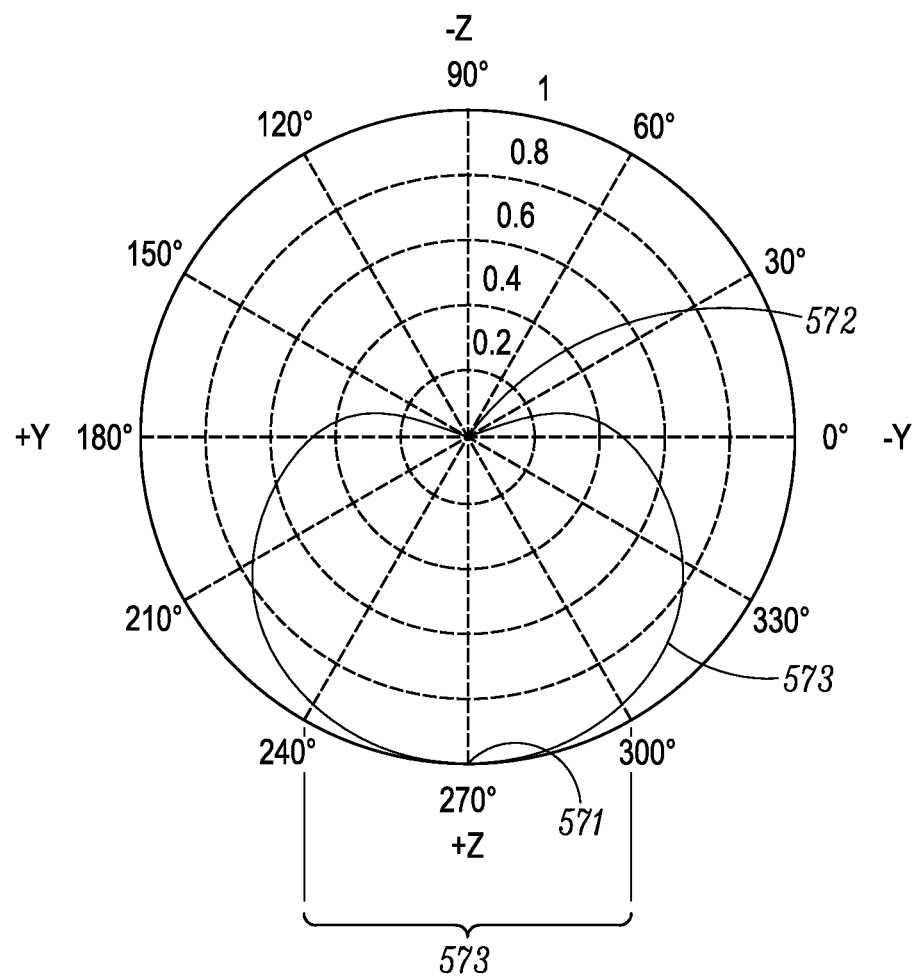
FIG. 5 exemplarily illustrates a directional acoustic transducer exhibiting a cardioid acoustic directional pattern.

Acoustic transducers can take one or two forms. One of the forms can be input transducers, such as microphones. The other form can be output transducers such as loudspeakers. A directional acoustic transducer is an acoustic transducer that is not omni-directional in nature, but rather has a spatial response that varies with angle. For example, as the angle of the source for an input transducer or the measurement pickup for an output transducer moves about the transducer the response varies. This directionality of a directional acoustic transducer is often expressed in polar plots which are a representation of this varying spatial response at a prescribed distance with the angle swept through a single plane. A polar plot in this manner defines an acoustic pattern. FIG. 5 depicts a polar plot of a directional acoustic transducer that exhibits a characteristic acoustic directional pattern, in this case, specifically a cardioid pattern. Other characteristic patterns could be used to get the proper angular alignment of the portion of the acoustic pattern with the limited viewable angular area of the display.

An acoustic coverage area can include a feature of the directional nature of the acoustic transducer such as a peak, a beam, or a null. The acoustic pattern of FIG. 5 exhibits a peak 571, a null 572, and a beam 573. An acoustic pattern can have multiple peaks, nulls, and beams.

A directional acoustic transducer can be a single element or comprise an array of multiple elements. A unidirectional microphone capsule is an example of a single element input directional acoustic transducer. Superdirectional microphone arrays are an example of a multiple element input directional acoustic transducer. A ribbon loudspeaker is an example of a single element output directional transducer. A directional handheld device loudspeaker system as described in U.S. Pat. No. 7,346,315, and incorporated herein by reference, is an example of a multiple element output directional acoustic transducer. A multiple element directional acoustic transducer can consist of omnidirectional elements, directional elements, or the combination of the two.

Figure 6:
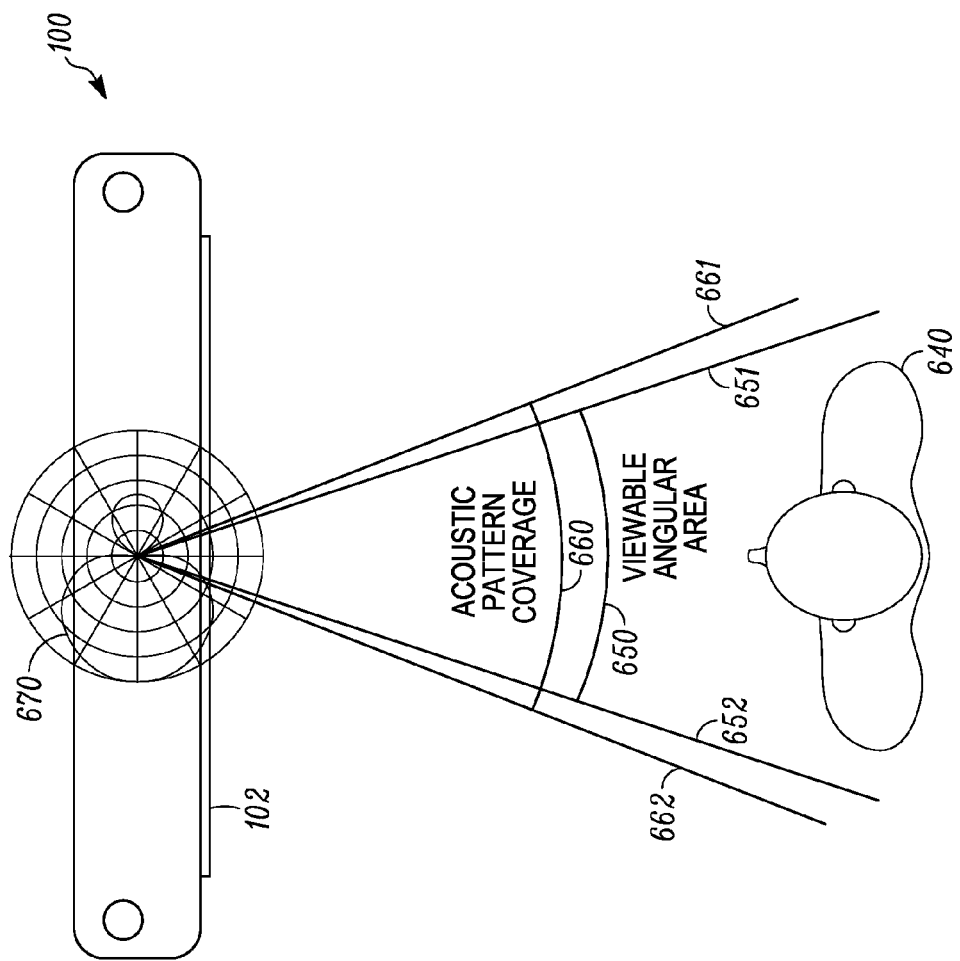
FIG. 6 exemplarily illustrates viewable angular bounds and angular acoustic coverage area bounds of an example characteristic acoustic null pattern.

FIG. 6 is a top down view of the display 102 of the A/V device 100 as shown previously in FIGS. 1 and 2; and operator 640 within a bounded viewable angular area 650 of the display 102. A viewable angular area 650 includes boundaries 651 and 652. Operator 640 has his head positioned within viewable angular area 650. Acoustic pattern coverage 660 is directed or orientated to the head of operator 640 due to his position, and includes boundaries 661 and 662. As exemplarily illustrated in FIG. 6, the position of the head of operator 640 is both within the viewable angular area 650 and the acoustic angular coverage area 660 of a characteristic acoustic pattern 670. Acoustic angular coverage area 660 has been aligned with the viewable angular area 650. Therefore, visual output and audio output are deemed optimal to operator 640, because of said positioning of operator 640. Nevertheless, because the characteristic acoustic pattern 670 in FIG. 6 is an acoustic null, its alignment with the viewable angular area 650 to form acoustic pattern coverage area 660 results in any audio coming from operator 640 to be effectively cancelled in the captured audio signal. The exemplarily configuration shown in FIG. 6 can have many uses, including providing estimates for noise suppression algorithms or recording of video of a subject without capturing the sounds of operator of the video recorder.

Figure 7A:
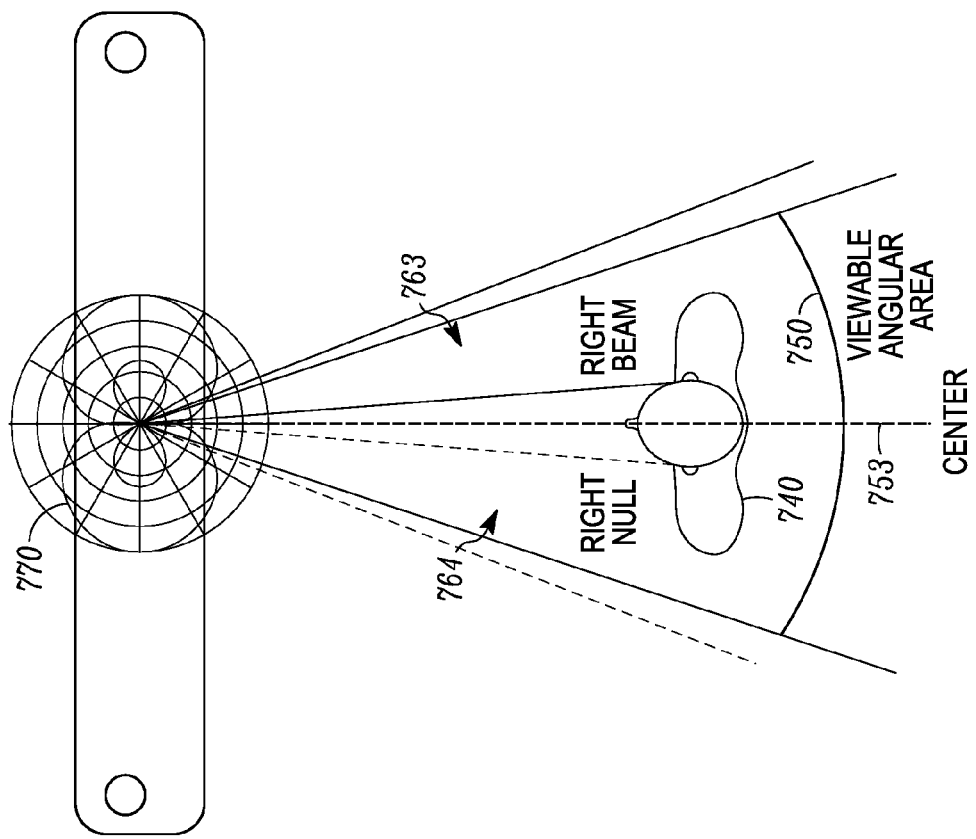
FIG. 7A exemplarily illustrates, via a top down view, an operator impacted by a beam oriented towards one ear and a null oriented towards the other ear.

FIG. 7A exemplarily illustrates, via a top down view, an operator 740 impacted by a beam 763 oriented towards one ear and a null 764 oriented towards the opposite ear when the operator 740 is centered within the viewable angular area 750. In this implementation the center 753 of the viewable angular area 750 is designed to be oriented between the null 764 and beam 763. A signal is supplied to the directional acoustic transducer which has a characteristic acoustic pattern 770. The characteristic acoustic pattern 770 has an audio beam 763 oriented towards the right ear of the operator and a null 764 oriented towards the opposite ear of the operator; thereby providing sound to only one ear providing a virtual right channel of a virtual headset operation for the operator of the A/V device. The beamform can be a relative maxima or a relative minima. FIG. 7A depicts the center 753 of the viewable angular area 750 as oriented between the null 764 and beam/maxima 763.

Figure 7B:
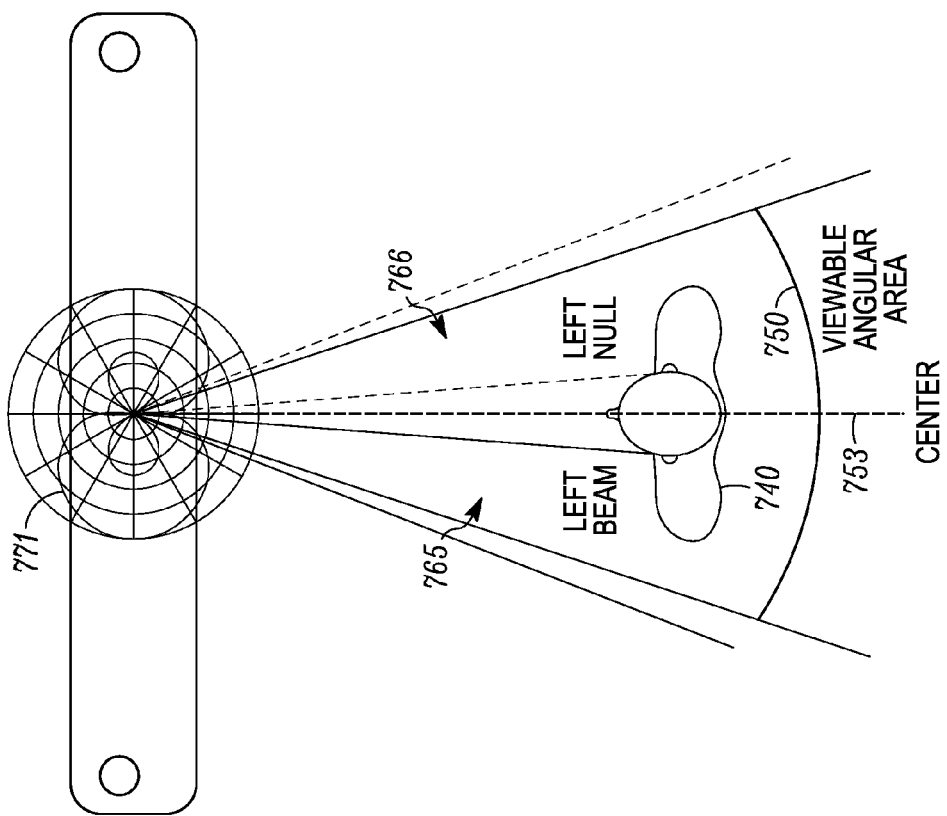
FIG. 7B exemplarily illustrates, via a top down view, an operator impacted by a beam oriented towards an ear, different than in FIG. 7A, and a null oriented towards the other ear, also different than illustrated in FIG. 7A.

FIG. 7B analogously illustrates, via a top down view, an operator impacted by a beam 765 oriented towards one ear and a null 766 oriented towards the opposite ear when the operator 740 is centered within the viewable angular area 750, however different than that shown in FIG. 7A. In this implementation the center 753 of the viewable angular area 750 is designed to be oriented between the null 766 and beam 765. A signal is supplied to the directional acoustic transducer which has a characteristic acoustic pattern 771. The characteristic acoustic pattern 771 has an audio beam 765 oriented towards the left ear of the operator and a null 766 oriented towards the opposite ear of the operator; thereby providing sound to only one ear and providing a virtual left channel of a virtual headset operation for the operator of the A/V device. The beamform can be a relative maxima or a relative minima. In this manner, separate acoustic signals are produced proximate each ear of the operator from a single A/V device.

The individual signals can also be processed using known Head Related Transfer Functions (HRTF), thereby allowing the device to form audio in several virtual positions anywhere around the operator. Consequently, a virtual surround sound playback can be heard in an A/V device, such as a tablet computing device, without the use of physical headphones.

An audio/visual (A/V) electronic device is any device that captures or presents to an operator both audio and visual information. The visual information can be still or moving images and can be formatted to be in two or three dimensions. Exemplary audio visual electronic devices are: media players, electronic photo frames, laptop computing devices, tablet computing devices, portable communication devices, gaming devices, fixed communication devices, image kiosks, navigation devices, e-book readers, video recorders, media recorders, and video monitors.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Additionally, a non-transitory machine readable storage device, having stored thereon a computer program that include a plurality of code sections for implementing the method described herein can be used as well. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An audio/visual (A/V) electronic device, comprising:
a display;
an integrated visual angular limitation device employed to limit a viewable angular area of the display; and
one or more directional acoustic transducers having an associated characteristic acoustic pattern that includes at least a portion of the characteristic acoustic pattern cooperatively aligned with the limited viewable angular area of the display.

2. The A/V electronic device according to claim 1, wherein the at least one portion of the characteristic acoustic pattern is selected from the group consisting of a null, a beam, or a peak.

3. The A/V electronic device according to claim 2, wherein the null characteristic acoustic pattern is aligned with the limited viewable angular area of the display.

4. The A/V electronic device according to claim 2, wherein the beam characteristic acoustic pattern is aligned with the limited viewable angular area of the display.

5. The A/V electronic device according to claim 2, wherein the peak characteristic acoustic pattern is aligned with the limited viewable angular area of the display.

6. The A/V electronic device according to claim 1, further comprising a first beam aligned right of center of the display and a first null aligned left of center of the display.

7. The A/V electronic device according to claim 6, wherein each beam is processed with a head-related transfer function in order to reproduce a surround sound field as a virtual headphone.

8. The A/V electronic device according to claim 1, further comprising a second beam aligned left of center of the display and a second null aligned right of center of the display.

9. The A/V electronic device according to claim 1, wherein the integrated visual angular limitation device of the display is a film covering the display.

10. The A/V electronic device according to claim 1, wherein the integrated visual angular limitation device of the display is a parallax barrier.

11. The A/V electronic device according to claim 1, wherein the integrated visual angular limitation device of the display is a combined film and parallax barrier.

12. The A/V electronic device according to claim 1, wherein the integrated visual angular limitation device of the display is a louvered barrier.

13. The A/V electronic device according to claim 1, wherein the limited viewable angular area includes one or more boundary edges that define an extent of the viewable angular area.

14. The A/V electronic device according to claim 13, wherein image attenuation occurs external to the one or more boundary edges of the limited viewable angular area.

15. The A/V electronic device according to claim 13, wherein the one or more boundary edges define a three-dimensional/two-dimensional transition.

16. The A/V electronic device according to claim 13, wherein image degradation occurs external to the one or more boundary edges of the limited viewable angular area.

17. The A/V electronic device according to claim 16, wherein the image degradation is selected from the group comprising: image blurring, color-shifting of an image, and image decorrelation.

18. The A/V electronic device according to claim 1, wherein the one or more directional acoustic transducers comprise a microphone or a microphone array.

19. The A/V electronic device according to claim 1, wherein the one or more directional acoustic transducers comprise a speaker or a speaker array.

20. The A/V electronic device according to claim 1, wherein the A/V electronic device is selected from the group consisting of: media player, laptop computing device, electronic photo frame, image kiosk, e-book reader, navigation device, tablet computing device, fixed communication device, portable communication device, gaming device, video recorder, media recorder, and video monitor.

* * * * *